United States Patent [19]
Rennels

[11] 3,805,003
[45] Apr. 16, 1974

[54] MOTORCYCLE HANDLE SIGNAL CONTROL ROTATABLE OR DEPRESSIBLE TO ACTUATE SIGNAL CONTROLLING SWITCHES

[76] Inventor: William Marion Rennels, 930 E. La Pasadita, Tucson, Ariz. 85719

[22] Filed: Nov. 15, 1972

[21] Appl. No.: 306,806

[52] U.S. Cl................. 200/157, 200/4, 200/61.85, 200/172 A
[51] Int. Cl.... H01h 9/06, H01h 21/10, H01h 25/06
[58] Field of Search ........ 200/157, 4, 61.85, 61.87, 200/61.27, 172 A

[56] References Cited
UNITED STATES PATENTS
2,794,891  6/1957  Appleton ...................... 200/172 A
3,190,994  6/1965  Becker et al...................... 200/157
3,619,519  11/1971  Wiggins .............................. 200/4

FOREIGN PATENTS OR APPLICATIONS
592,160  9/1947  Great Britain..................... 200/157
1,056,062  4/1959  Germany ........................... 200/157

Primary Examiner—James R. Scott
Assistant Examiner—Robert A. Vanderhye
Attorney, Agent, or Firm—Cahill, Sutton & Thomas

[57] ABSTRACT

The warning signal control of the present invention is especially adapted to be employed on vehicles which are steered by means of a handle-bar, such as motorcycles, and the like. The signal control comprises an elongated tubular sleeve which is rotatably mounted on the end portion of one of the handle-bars, its rotation being limited by a pin carried by the handle-bar which engages a transverse slot in the sleeve. The inner end of the sleeve is provided with a disc, one segment of which is firmly secured to the sleeve and the other segment is hinged thereto whereby it may be swung inwardly, and out of the plane of the secured segment, to actuate a switch for the warning signal. The secured segment engages the actuating arm of a switch which operates turn signals when said arm is moved by rotation of the sleeve and the segment secured to it. A conventional rubber grip may be fitted over the sleeve.

5 Claims, 3 Drawing Figures

PATENTED APR 16 1974 3,805,003
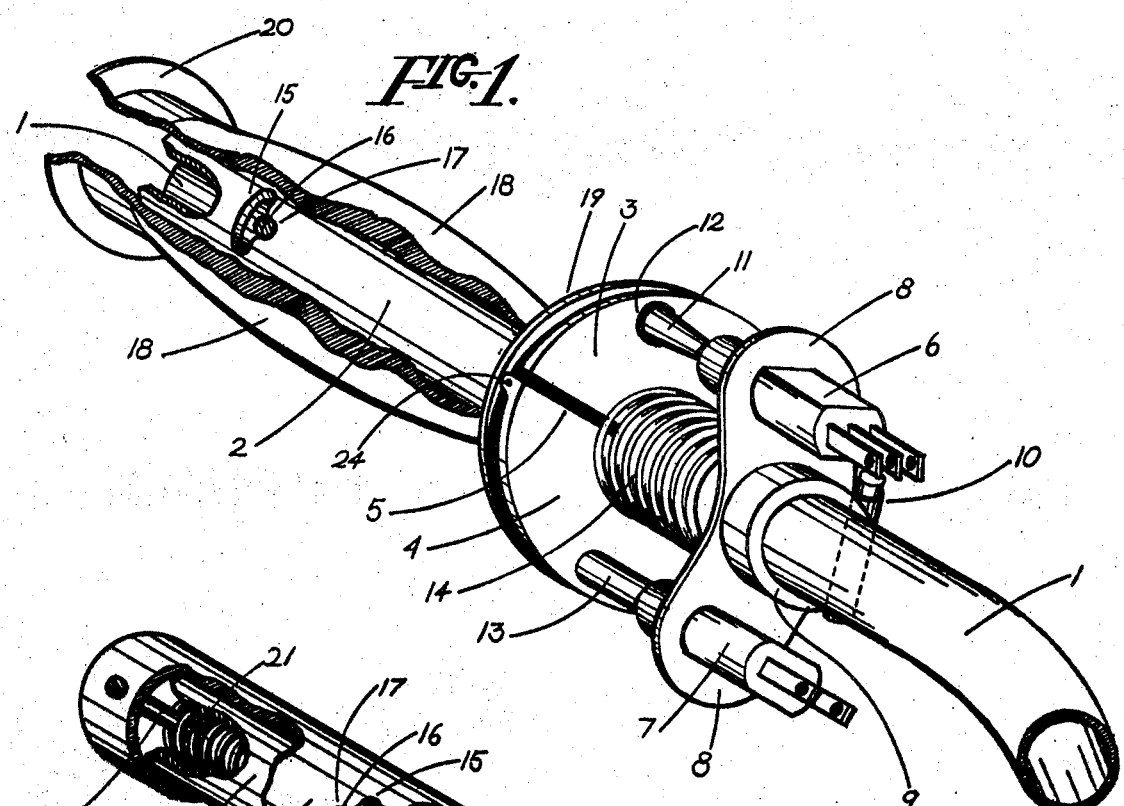
FIG. 1.
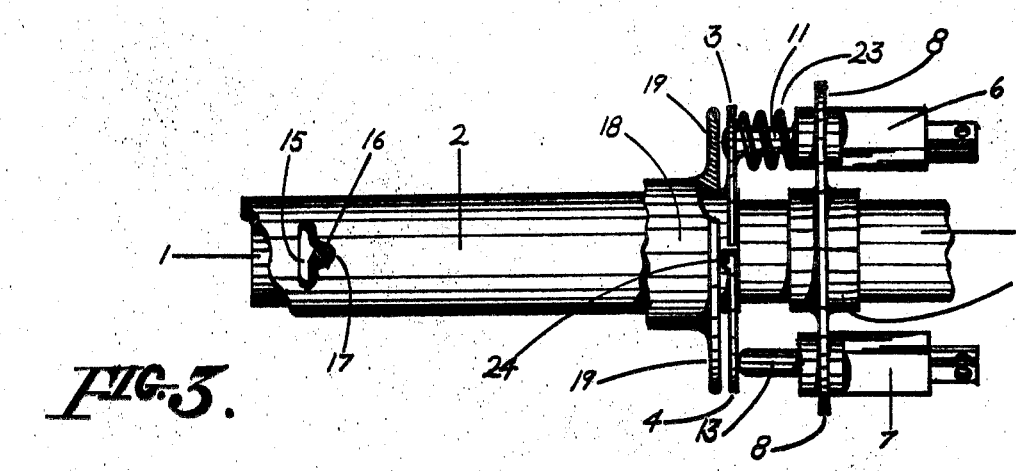
FIG. 2.
FIG. 3.

MOTORCYCLE HANDLE SIGNAL CONTROL ROTATABLE OR DEPRESSIBLE TO ACTUATE SIGNAL CONTROLLING SWITCHES

The present invention relates to a signal control device and more particularly to such a device adapted for use on vehicles which are steered or guided by means of a handle-bar, such as motorcycles, bicycles, tricycles, and the like.

It is an object of the present invention to provide a signal control which may be operated by the vehicle driver without having to remove either hand from the steering control or handle-bar.

Another object is the provision of a signal control which can be readily operated without the necessity of interrupting the driver's view of the terrain being traversed by the vehicle.

A further object is to provide such a device which is simple, foolproof and which is adapted to be used on all types of handle-bars.

Another object is to provide a single device which can operate a turn signal and a warning horn selectively or simultaneously.

Another object is to provide a novel and improved circuit controller for electrically operated visual and audible signals of the kind stated which is efficient in operation, and easily actuated.

The above and other objects, features and advantages of the present invention will be fully understood from the following description, reference being had to the accompanying drawings, wherein a preferred embodiment of the invention is clearly shown.

In the Drawings:

FIG. 1 is a perspective view, partly broken away, of a control device embodying the present invention;

FIG. 2 is a similar view of a modified version of the device shown in FIG. 1; and, FIG. 3 is a fragmentary elevational view showing another modification of the device of FIG. 1.

Referring more specifically to the drawings, and particularly FIG. 1, the outer or end portion of a motorcycle handle-bar 1 is shown. A tubular metal sleeve 2 is mounted on the outer end portion of the handle-bar 1 and is adapted to be rotated on the handle-bar. It is preferred that the outer end of the sleeve 2 should be substantially coterminus with the outer end of the handle-bar 1. In practice, I prefer to mount the sleeve 2 so that it extends slightly beyond the end of the handle-bar. (Note FIGS. 1 and 3). The inner end of the sleeve 2 has a segment 3, of a substantially circular plate secured thereto by soldering, welding or the like, so that such segment is integral with the sleeve 2. The other semicircular plate segment 4 is pivotably mounted on a pin 24 carried by the sleeve 2 and which extends perpendicularly from opposite sides thereof. Thus the segment 4 may be freely swung inwardly from the plane of segment 3 (i.e., away from the outer end of the handle-bar 1). A pair of switches 6 and 7 are carried by a yoke 8, the hub 9 of which is secured to the handle-bar 1 by being clamped thereon by means of the screw 10 (FIG. 1). The switch 6 is a three position toggle switch actuated by the lever which extends into a hole 12 in the upper segment 3 of the circular plate, so that when the sleeve 2 is rotated on the handle-bar the switch 6 can (by wires not shown) close so as to cause a left turn or right turn signal, such as a flashing light or lights, to be activated, depending on which direction the sleeve 2 and circular plate segment 3 are rotated. When the sleeve 2 and segment 3 are rotated so as to return the lever 11 to middle position, the switch is, of course, open so that neither turn signal is operating.

The switch 7 is of the two position type and is actuated into closed position by pushing on the end of the shaft (or elongated "button") 13 so as to move it inwardly of the switch 7. When this is done, a circuit is closed so that the warning signal (such as a horn) is activated. When the inward force is removed from the shaft 13, a spring returns it to fully extended position with the result that the switch is open and the flow of current to the signal is interrupted.

It will be noted that the segmented circular plate (3, 4) and yoke 8 are spaced from each other. In the embodiment shown in FIG. 1 a coil compression spring 14 is carried by the handle-bar 1 and presses against the yoke 8 and the segmented plate carried by the sleeve 2. The sleeve 2 is provided with a slot 15 into which extends a pin 16. The other end of pin 16 extends into a hole in the opposite side of the handle-bar 1 and rests against the inner side of sleeve 2 opposite the slot 15. Thus the pin 16 and the slot 15 function to limit latter movement of the sleeve 2 by reason of spring 14. It will be noted that the slot 15 is provided with an intermediate detent 17 which functions to hold the sleeve 2 in a middle or inactive position so far as switch 6 is concerned. A conventional type rubber grip 18 is fitted over the sleeve 2 and is provided with flanges or guards 19 and 20. The inner guard 19 is preferably of greater diameter than the outer or end guard 20. It is preferable that the inner guard flange 19 be of substantially the same diameter of the segmented circular plate 3, 4. The rubber grip 18 rests against the end of pin 16, thereby retaining it in its proper longitudinal position.

In the embodiment shown in FIG. 2, a tension spring 21 is employed to exert an inward force against the sleeve 2 and pin 16. In this case, the detent 17 is on the opposite (or outer) side of slot 15. The inner end of tension spring 21 is secured to pin 16 and the outer end is secured to a pin 22 carried in holes bored in the sleeve 2. In this case, the sleeve 2 extends sufficiently beyond the end of the handle-bar so that pin 22 is always out of contact with the end of the handle-bar. The spring 21, it will be noted, is inside the tubular end portion of the handle-bar 1. The pin 22 is held in place by the grip 18.

In the embodiment shown in FIG. 3, the spring force against the sleeve 2 is provided by a compression spring 23 interposed between the rigid segment 3 carried by the sleeve and the switch carrying yoke 8. This spring is placed over the toggle arm 11 of the switch 6. The function of this spring is the same as that of spring 14, except that it does not apply any force or pressure against the hinged segment 4. In practice, I have found this embodiment of FIG. 3 to be the preferred one in most respects.

In operation, the spring 14, 21 or 23 holds the pin 16 firmly in engagement with the detent 17 in slot 15 with the result that a substantial degree of effort is required to start rotation of sleeve 2 (and the rubber grip 18 carried by it). When the operator or driver of the vehicle, such as a motorcycle, desires to activate the turn signal (or signals) to indicate a left turn is to be made, he simply twists or rotates the grip and sleeve toward the left to the extent permitted by the pin 16 and slot 15. Thus, the toggle arm 11 of switch 6 is moved to close the switch 6 so as to activate the proper signal (or signals). The signal electrical circuit is deactivated by counter rotation until the pin 16 engages detent 17, thus holding the system in inactive position as far as turn signaling is concerned. A right turn is indicated similarly by rotating the grip-sleeve assembly to the right to the extent permitted by slot 15.

The warning signal, or horn, may be put into operation at any time by the driver or rider pressing his thumb against the rubber flange 19 whereby it is flexed inwardly against the hinged segment 4 so as to cause it to pivot inwardly and force the shaft 13 inwardly so as to close switch 7, thus activating the electrical circuit to cause the warning signal to sound. When such thumb pressure is released, the spring urged shaft 13 moves outwardly, thus opening the switch 7 and returning the hinged segment 4 and flange 19 to normal position as shown in FIGS. 1 and 3.

It will be appreciated that the three specific embodiments all operate similarly as far as the driver or rider are concerned. It may be embodied otherwise than as hereinabove specifically illustrated or described, and that various changes in the details of construction and in the form and arrangement of parts of the illustrated embodiment may be made without departing from the underlying idea or principles of this invention within the scope of the appended claims.

I claim:

1. A signal actuator for handle-bar steered vehicles comprising:
    an elongated tubular sleeve rotatably mounted on the outer portion of an arm of said handle-bar;
    a transversely disposed plate rigidly secured to said sleeve adjacent the inner end thereof;
    an electrical switch carried by said handle-bar and disposed inwardly of said plate, said switch being selectively closed or opened by rotation of said sleeve and said plate;
    a second plate hingedly mounted below said first named plate, said plates being normally disposed in substantially the same plane; and,
    a second switch carried by said handle-bar and disposed inwardly of said second plate, said second switch being normally in open position and closed by application of an inwardly directed force against said second plate to cause the same to pivot toward said second switch to effect closure thereof.

2. The invention of claim 1 wherein the sleeve is provided with a transverse slot into which extends a pin carried by said handlebar arm, whereby the degree of rotation of said sleeve is limited.

3. The invention of claim 2 wherein said slot is provided with a detent at an intermediate point thereof, spring means for exerting a longitudinal force on said sleeve to cause the aforesaid pin to engage said detent and hold said sleeve in a neutral position so that said first named switch normally is in open position.

4. The invention of claim 3 wherein the first named switch is a three position type adapted to selectively actuate left and right turn signals and said second named switch is adapted to activate a warning sound, and a rubber hand grip enveloping said sleeve.

5. The invention of claim 4 wherein both said switches are carried by a yoke mounted on said handle-bar arm, said yoke being located inwardly with respect to said plates and spaced therefrom, a pressure spring interposed between said yoke and said rigidly secured plate thereby exerting the aforesaid longitudinal force upon said sleeve.

* * * * *